United States Patent [19]

Geiser

[11] Patent Number: 4,652,198

[45] Date of Patent: Mar. 24, 1987

[54] APPARATUS FOR ACCUMULATING STACKS OF PAPER SHEETS

[75] Inventor: Peter Geiser, Matzingen, Switzerland

[73] Assignee: Grapha-Holding AG, Hergiswil, Switzerland

[21] Appl. No.: 783,192

[22] Filed: Oct. 2, 1985

[30] Foreign Application Priority Data

Oct. 2, 1984 [CH] Switzerland ........................ 4732/84

[51] Int. Cl.[4] ........................................ B65G 47/30

[52] U.S. Cl. ........................................ 414/51; 198/436

[58] Field of Search ........................ 198/436; 414/51

[56] References Cited

U.S. PATENT DOCUMENTS 3,250,371 5/1966 Cella et al. ...................... 198/436 X
4,394,902 7/1983 Mazzoni ............................ 198/436

FOREIGN PATENT DOCUMENTS 2025882 1/1980 United Kingdom ................ 198/436

*Primary Examiner*—Robert J. Spar
*Assistant Examiner*—Janice Krizek
*Attorney, Agent, or Firm*—Peter K. Kontler

[57] ABSTRACT

Apparatus for simultaneously accumulating two stacks of paper sheets has a first conveyor which advances a series of sheets into the range of a first transfer member so that successive sheets are respectively adjacent the front and rear surfaces of the transfer member. The transfer member is reciprocable transversely of the path of movement of oncoming sheets, and each of its forward strokes is utilized to expel a sheet into a first stack forming station. Each return stroke of the transfer member is utilized to advance a sheet into the range of a second conveyor which transports sheets forwardly beyond the first stack forming station and into the range of a second transfer member. When the first transfer member performs a forward stroke, the second transfer member expels the foremost sheet from the second conveyor into a second stack forming station. The first conveyor has a first pusher which is moved cyclically along a first endless path to alternatingly advance successive sheets along the first path adjacent the front and rear surfaces of the first transfer member. A second pusher which is rigid with the first pusher, serves to advance successive sheets in the second path in front of the second transfer member.

9 Claims, 5 Drawing Figures

APPARATUS FOR ACCUMULATING STACKS OF PAPER SHEETS

BACKGROUND OF THE INVENTION

The present invention relates to improvements in apparatus for accumulating stacks of paper sheets and the like. More particularly, the invention relates to improvements in apparatus for simultaneously accumulating several stacks of paper sheets or the like.

It is already known to transport a succession of discrete paper sheets or groups of paper sheets along a predetermined path and to employ a pusher which advances successive sheets or groups of sheets into the range of a transfer member which is reciprocable transversely of the direction of movement of sheets. The transfer member expels a first sheet or group of sheets (hereinafter called sheet) in a first direction during forward movement transversely of the path of advancement of sheets, and the transfer member thereupon expels the next-following sheet in the opposite direction during rearward movement transversely of such path. The transfer member has two parallel surfaces including a front surface which expels a sheet during forward movement and a rear surface which expels a sheet during rearward movement of the transfer member.

An advantage of the just outlined conventional apparatus is that they can accumulate stacks of sheets at a high frequency because each forward and each rearward movement of the transfer member is utilized to expel a sheet from the path which is defined by the conveyor. However, such apparatus also exhibit a serious drawback, namely that the stacks are accumulated at the opposite sides of the path which is defined by the conveyor. Therefore, such apparatus cannot be readily installed in existing edifices for printing, newspaper section gathering and similar plants.

OBJECTS AND SUMMARY OF THE INVENTION

An object of the invention is to provide an apparatus which can simultaneously accumulate several stacks or arrays of paper sheets or groups of paper sheets in a small area and at the same frequency as the aforedescribed conventional apparatus.

Another object of the invention is to provide an apparatus wherein all of the stacks are accumulated at one and the same side of the path of oncoming discrete sheets or groups of sheets.

A further object of the invention is to provide the apparatus with novel and improved means for manipulating sheets which are expelled from their initial path in response to rearward movement of the transfer member.

Still another object of the invention is to provide the apparatus with novel and improved means for simultaneously accumulating plural stacks of paper sheets or the like next to each other and in such a way that the stacks grow at the same rate.

Another object of the invention is to provide a novel and improved method of converting a single file of travelling sheets or groups of sheets into several stacks of superimposed sheets.

The invention is embodied in an apparatus for simultaneously accumulating plural stacks of paper sheets or analogous commodities. The apparatus comprises a first conveyor which is operative to transport a series of preferably equidistant commodities in a predetermined direction and along a first path (for example, the commodities can be located in a vertical plane and can advance along an upwardly sloping path), a second conveyor which is operative to advance commodities in the same direction along a second path having a portion which extends beyond the first path, as considered in the direction of advancement of commodities along the first path, a first transfer member, means for moving the first transfer member in synchronism with the first conveyor transversely of the first path forwardly and backwardly at such frequency that the first transfer member expels a first oncoming commodity in a first direction during the forward movement and the next oncoming commodity in a second direction and into the second path during the rearward movement of the first transfer member, and a second transfer member which is operatively (for example, rigidly) connected with the first transfer member so as to expel a commodity from the aforementioned portion of the second path and in the first direction when the first transfer member expels a commodity from the first path during the forward movement thereof. Thus, the two transfer members can accumulate stacks of commodities next to each other in response to forward movements of the first transfer member.

The first conveyor preferably comprises a pusher and means for moving the pusher along a third path a portion of which coincides with a portion on the first path so that the pusher moves successive commodities of the series into the range of the first transfer member during each movement along the aforementioned portion of the third path.

The first transfer member preferably includes a front surface which engages a commodity during each forward movement and a rear surface which engages a commodity during each rearward movement on the first transfer member. Such front and rear surfaces are preferably parallel to each other. The second transfer member has a front surface which expels a commodity from the aforementioned portion of the second path in response to each forward movement of the first transfer member. The first and second paths are spaced apart from one another, as considered transversely of the first path, and the front surfaces of the two transfer members are preferably disposed in parallel planes which are also spaced apart from one another, as considered transversely of the first path. The mutual spacing of the front surfaces is preferably identical or substantially identical with the mutual spacing of the first and second paths.

The first conveyor is preferably movable (most preferably pivotable) between a first position in which it advances successive commodities of the series along the first path and the second position, and the apparatus preferably further comprises a third conveyor which serves to receive or accept successive commodities from the first conveyor when the first conveyor assumes the second position. As mentioned above, the first path preferably slopes upwardly.

The first conveyor can include a first platform having an upwardly sloping upper side when the first conveyor is held in the first position, and the apparatus preferably further comprises a second platform having an upper side which is flush with the upper side of the first platform in the first position of the first conveyor. The first transfer member preferably expels commodities from the first path by moving such commodities along the upper side of the second platform. The first conveyor can further comprise means for entraining the commodities of the series along the upper side of the first platform.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
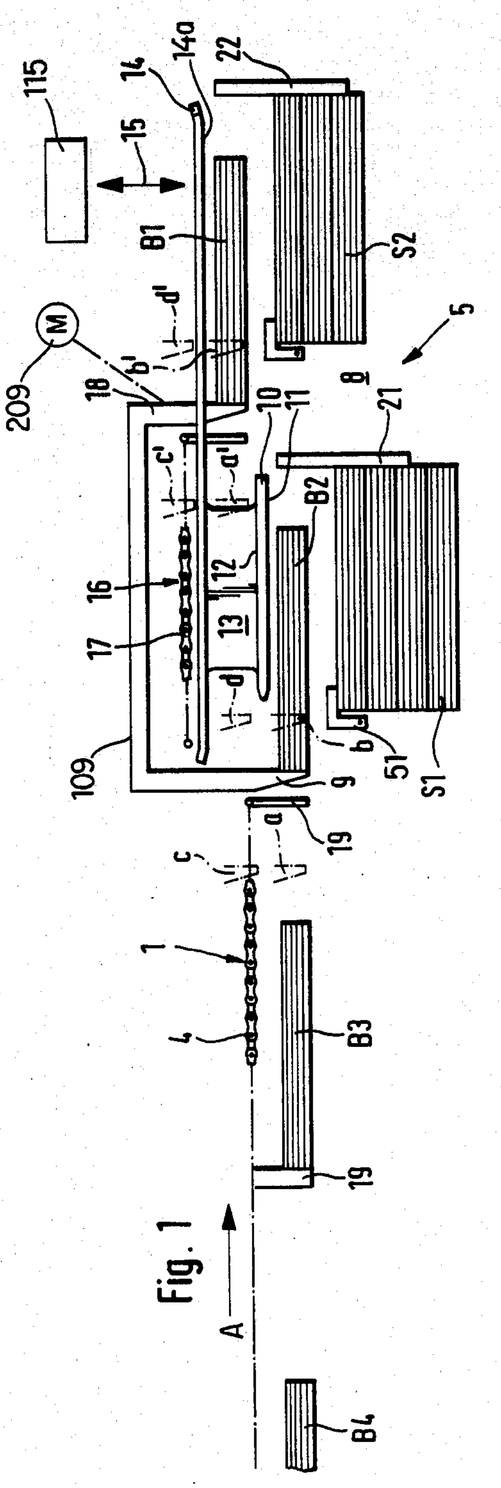
FIG. 1 is a schematic plan view of an apparatus which embodies one form of the invention, the foremost commodity of the series being in the process of advancing in front of one surface of the first transfer member.

The improved apparatus comprises a first conveyor 1 which includes a pivotable platform 2 and an endless chain or belt 4 with entraining elements or fingers 19 serving to advance a series of equidistant commodities B in the form of stacked paper sheets, e.g., from a perfect binder onto the upper side 8 of a second platform 7. When the first conveyor 1 is held in the solid-line position of FIG. 5, the upper side of the first platform 2 is flush with the upper side 8 of the second platform 7. Each commodity B can comprise a substantial number of closely adjacent parallel paper sheets with one marginal portion of the group of sheets bonded to each other by a suitable adhesive in a perfect binder or in another suitable machine, not shown. The platform 7 forms part of a stack accumulating unit 5 which is designed to accumulate two stacks S1 and S2 in a simultaneous operation.

Figure 5:
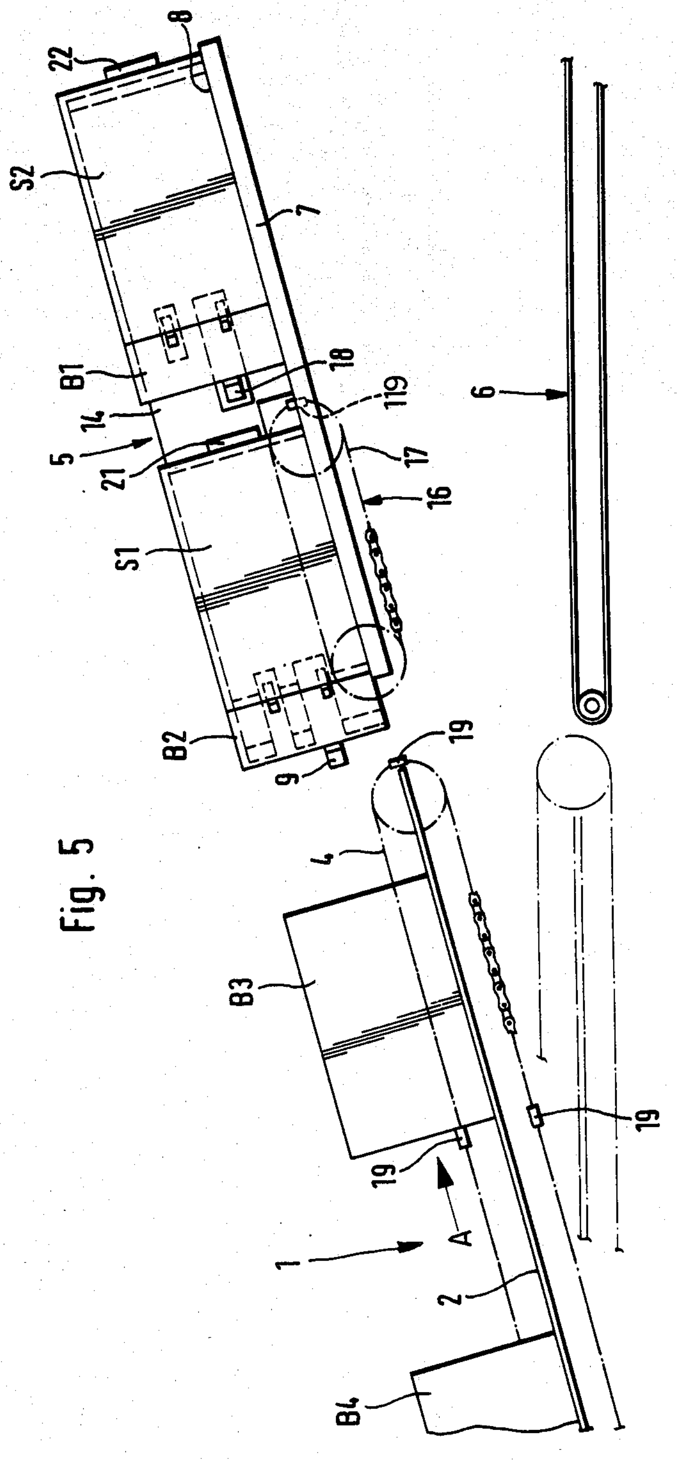
FIG. 5 is a schematic side elevational view of the apparatus which is shown in FIGS. 1 to 4.

The conveyor 1 is pivotable between the two positions which are shown in FIG. 5. When the conveyor 1 assumes the position in which the upper side of the first platform 2 is horizontal or substantially horizontal, such upper side is flush with the upper side of the upper reach of an endless belt or chain conveyor 6 which serves to advance the commodities B to storage or to another destination. For example, the conveyor 6 can transport commodities B to a drying apparatus or to a trimming machine, not shown.

The conveyor 1 further comprises a pusher 9 which is movable along an endless path between the positions a, b, d and c. The function of the pusher 9 is to advance successive commodities B which are delivered along the upper side of the platform 2 into the range of a first transfer member 10 in the form of a vertical plate having a front side or surface 11 and a rear side or surface 12. The surfaces 11 and 12 are preferably parallel to each other and to the direction (see the arrow A) of advancement of successive commodities B along the upper side of the platform 2. A portion of the path for the pusher 9 coincides with a portion of the path which is defined by the first conveyor 1. Such portion of the path for the pusher 9 extends between the positions a and b which are shown in FIG. 1. The means for cyclically moving the pusher 9 in synchronism with the conveyor 1 includes a motion transmitting member 109 and a suitable prime mover or transmission 209.

The first transfer member 10 is rigidly connected with a second transfer member 14 by a web or rib 13. The front surface **14*a* of the second transfer member 14 is parallel to and is spaced apart from the front surface 11 of the first transfer member 10. The apparatus further comprises a conveyor 16 which can advance selected commodities B along a second path extending in parallelism with the path which is defined by the conveyor 1 and including a portion disposed in the region of the right-hand portion of the transfer member 14, as viewed in FIG. 1, and thus extending beyond the first path. The purpose of the conveyor 16 is to advance selected commodities, which are delivered thereto by the rear surface 12 of the first transfer member 10, in the direction of the arrow A and into the range of the front surface 14*a* of the second transfer member 14. The conveyor 16 comprises an endless chain or belt 17 with pushers or entraining elements 119 similar to the fingers 19 of the endless chain or belt 4, and a second pusher 18 which is rigidly connected with the first pusher 9 by the moving means 109. The double-headed arrow 15 denotes the directions in which the transfer members 10 and 14 are respectively movable as a unit transversely of the (first) path which is defined by the conveyor 1 and transversely of that portion on the path defined by the conveyor 16 which extends forwardly beyond the first path. The means for reciprocating the transfer members 10 and 14 in directions which are indicated by the arrow 15 is denoted schematically by the reference character 115. The reference characters a', b', d' and c' denote four corner positions of the second pusher 18 during its movement along an endless rectangular path which is analogous to the endless path (a, b, d, c) for the pusher 9**.

The operation of the apparatus is as follows:

An entraining finger 19 of the endless chain or belt 4 advances the foremost commodity of the series of such commodities on the upper side of the platform 2 into the range of the pusher 9. The pusher 9 then moves from the retracted position c to the extended position a of FIG. 1 before advancing from the position a to the position b whereby the foremost commodity (see the commodity B2 in FIG. 1) is transported forwardly (arrow A) toward and into abutment with a stationary stop 21 on the upper side 8 of the platform 7. The transfer member 10 thereupon advances from the retracted position of FIG. 1 to the extended position of FIG. 2, namely transversely of the first path, to advance the commodity B2 from the position of FIG. 1 to the position of FIG. 2, namely into contact with the rearmost commodity of the stack S1 on the platform 7. It will be noted that the transfer member 10 assumes the retracted position of FIG. 1 at the time the pusher 9 advances the commodity B2 to a position in front of the surface 11.

The pusher 9 is retracted from the position b to the position d and is thereupon moved back to the starting position c as soon as the commodity B2 comes into abutment with the stop 21 on the platform 7. The platform 7 further supports a suitable retaining element 51 which is pivotable between the positions of FIG. 1 and 2 to permit the commodity B2 to advance against the rearmost commodity of the stack S1 and the element 51 thereupon retains such commodity against movement away from the remaining commodities of the stack S1.

Figure 2:
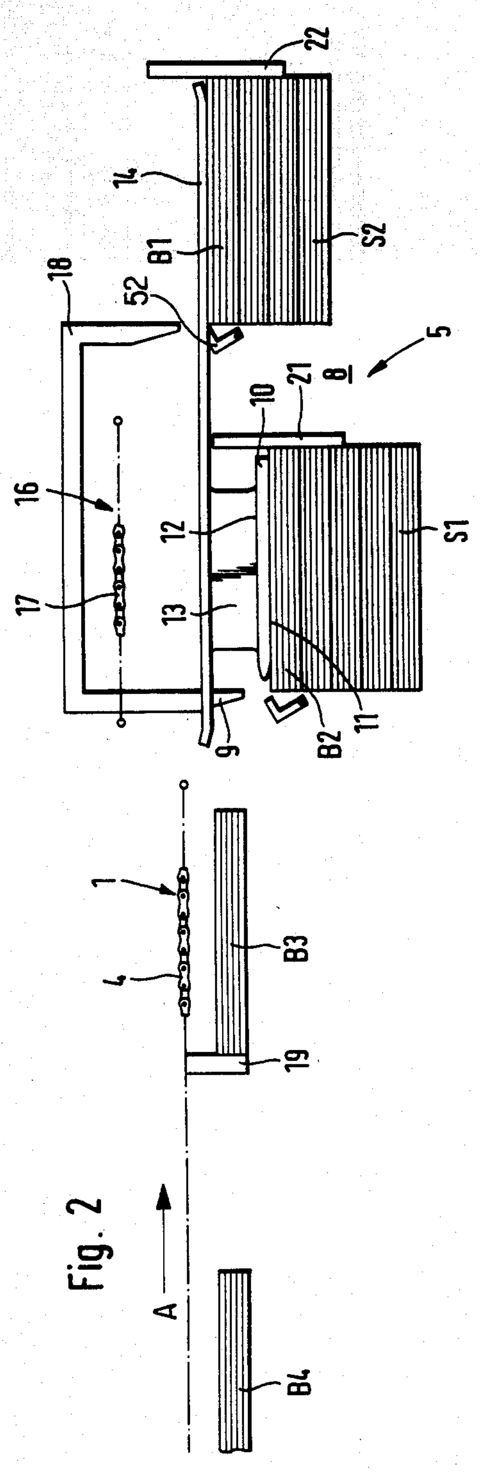
FIG. 2 is a similar plan view but showing the first transfer member during the last stage of forward movement so as to expel a commodity from the first path against the rearmost commodity of the first stack.

The next entraining finger 19 of the conveyor 1 advances the corresponding commodity B3 behind the rear surface 12 of the transfer member 10 while the transfer member 10 advances from the position of FIG. 1 toward the position of FIG. 2. The commodity B3 is taken over by the pusher 9 which advances it toward the stop 21 before the transfer member 10 begins its return stroke from the position of FIG. 3 to the position of FIG. 4. During such rearward movement, the surface 12 of the transfer member 10 expels the commodity B3 from the first path into the second path which is defined by the conveyor 16, and such commodity is entrained by the oncoming finger 119 of the endless chain or belt 17 to advance in the direction of the arrow A toward and into abutment with a second stop 22 on the platform 7. When the transfer members 10 and 14 thereupon jointly perform their next forward strokes (downwardly, as viewed in FIGS. 1 to 4), the front surface **14*a* of the second transfer member 14 transfers the commodity B3 from the foremost portion of the second path (defined by the conveyor 16) against the rearmost commodity of the second stack S2 on the upper side 8 of the platform 7**.

FIG. 1 shows that the pusher 18 is in the process of advancing a commodity B1 against the stop 22 while the pusher 9 is in the process of advancing the commodity B2 toward the stop 21. When the commodities B2 and B1 respectively reach the stops 21 and 22, the transfer members 10 and 14 jointly perform a movement in a downward direction, as viewed in FIG. 1, toward the positions which are shown in FIG. 2 whereby the commodities B2 and B1 are simultaneously expelled from the respective paths in the same direction, namely to the same side of the first path to be added to the respective stacks S1 and S2. A pivotable retaining element 52 on the platform 7 engages and holds the commodity B1 against rearward movement not later than when the transfer members 10, 14 begin their rearward strokes.

Figures 3, 4:
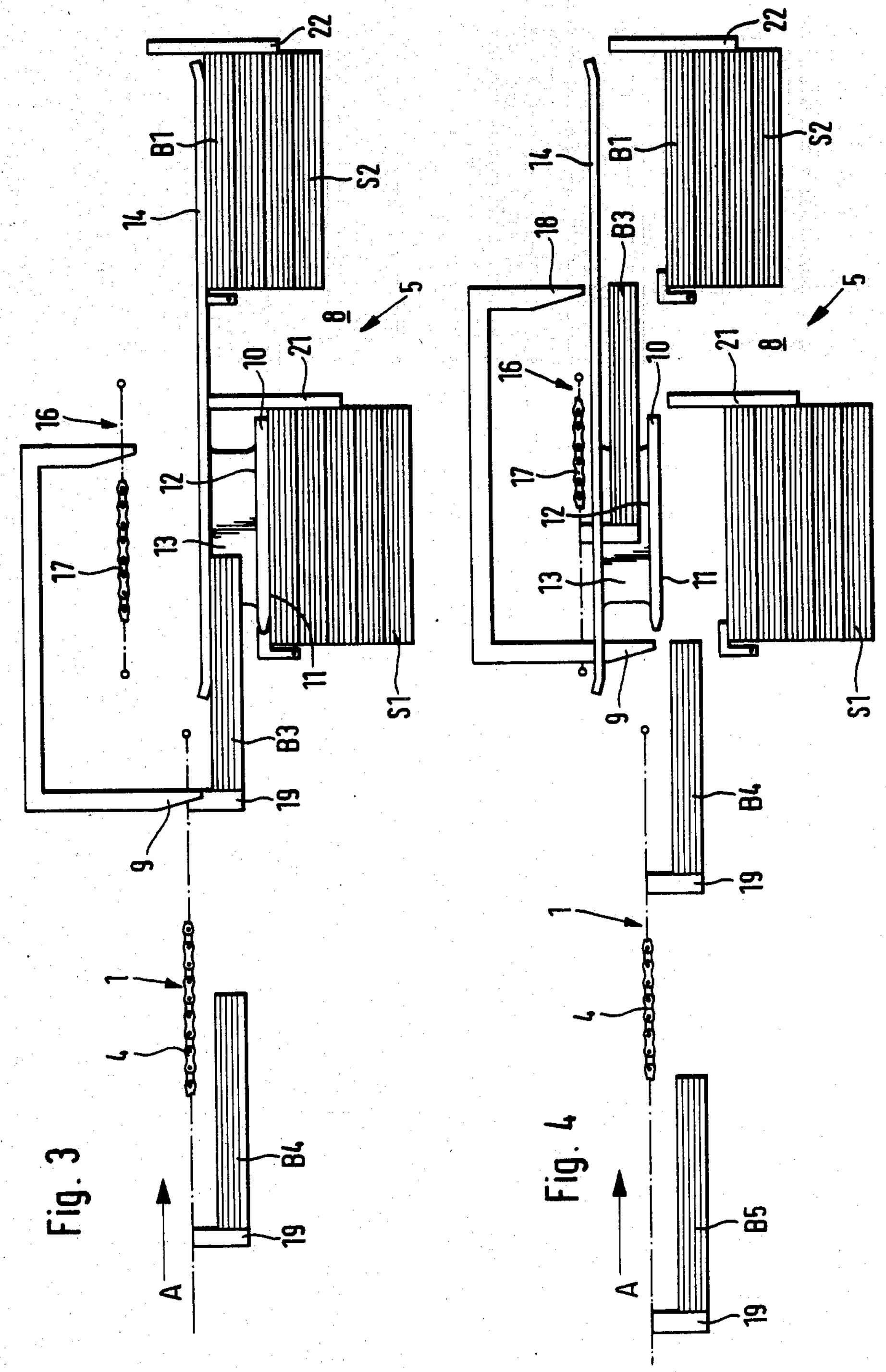
FIG. 3 is a similar plan view but showing the foremost commodity in the first path in the process of advancing into alignment with the other surface of the first transfer member.
FIG. 4 is a similar plan view but showing the second conveyor in the process of transporting a commodity into the range of the second transfer member.

FIG. 3 shows that the foremost entraining finger 19 of the chain or belt 4 is in the process of advancing the commodity B3 toward the stop 21 and into the range of the rear surface 12 of the first transfer member 10. The commodity B3 is thereupon engaged by the rear surface 12 while the transfer members 10 and 14 perform their return strokes, and this causes the commodity B3 to move into the path that is defined by the conveyor 16 so that the oncoming entraining finger 119 of the endless chain or belt 17 can advance the commodity B3 toward the stop 22. The last stage of forward movement of the commodity B3 is effected by the pusher 18 (see the pusher 18 and the commodity B1 of FIG. 1) whereupon the transfer member 14 moves downwardly, as viewed in FIG. 3, so as to expel the commodity B3 from the second path and against the rear side of the rearmost commodity forming part of the second stack S2.

The just described sequence of operations is repeated during the next-following cycles of the machine which embodies the improved apparatus, and portions of or the entire stacks S1 and S2 are periodically removed from the upper side 8 of the platform 7 when each of them accumulates a predetermined number of commodities B.

The conveyor 1 advances the foremost commodity B3 of FIG. 1, B4 of FIG. 3, B5 of FIG. 4, etc. into the range of the pusher 9 during each cycle of the machine. On the other hand the transfer members 10 and 14 perform-forward strokes during each second cycle and return strokes during each next following cycle of operation of the machine. Nevertheless, the apparatus can accumulate two stacks in a simultaneous operation because each return stroke of the transfer member 10 is used to expel a commodity from the first path (conveyor 1) into the second path (conveyor 16) so that the thus expelled commodity can be advanced by the oncoming entraining finger 119 into the range of the front surface **14*a* of the transfer member 14. It has been found that vibrations of the improved apparatus are not pronounced so that they do not adversely affect the operation in spite of the high output of the apparatus. The conveyor 1 can receive commodities from a high-speed perfect binder or a like machine because the series of commodities which are transported along the first path is broken up into two groups which are respectively used to form the stacks S1 and S2. The means for periodically removing portions of or the entire stacks S1 and S2 from the upper side 8 of the platform 7** forms no part of the present invention. The thus removed stacks or portions of stacks can be transported into a magazine or to a further processing station.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for simultaneously accumulating plural stacks of paper sheets or analogous commodities, comprising a first conveyor operative to transport a series of commodities in a predetermined direction and along a first path; a second conveyor operative to advance commodities in said direction along a second path having a portion extending beyond said first path; a first transfer member; means for moving said transfer member in synchronism with said first conveyor and transversely of said first path forwardly and rearwardly so that said transfer member pushes a first oncoming commodity in a first direction during the forward movement and pushes the next oncoming commodity, which is advanced behind the first transfer member subsequent to the start of forward movement of the first transfer member, in a second direction and into said second path during the rearward movement thereof; and a second transfer member operatively connected with said first transfer member to expel a commodity from said portion of said second path and in said first direction when said first transfer member pushes a commodity from said first path during said forward movement thereof.

2. The apparatus of claim 1, wherein said first conveyor comprises a pusher and means for moving said pusher along a third path having a portion coinciding with a portion of said first path so that said pusher moves successive commodities of said series into the range of said first transfer member during each movement along said portion of said third path.

3. The apparatus of claim 1, wherein said first transfer member has a front surface which engages a commodity during said forward movement and a rear surface which engages a commodity during said rearward movement of said first transfer member.

4. The apparatus of claim 3, wherein said second transfer member has a front surface which expels a commodity from said portion of said second path in response to forward movement of said first transfer member.

5. The apparatus of claim 4, wherein said first and second paths are spaced apart from one another, as considered transversely of said first path, and said front surfaces are disposed in parallel planes which are also spaced apart from one another, as considered transversely of said first path, the mutual spacing of said front surfaces being substantially identical to the mutual spacing of said paths.

6. The apparatus of claim 1, wherein said first conveyor is movable between a first position in which it advances successive commodities along said first path and a second position, and further comprising a third conveyor arranged to receive successive commodities from the first conveyor when the latter assumes said second position.

7. The apparatus of claim 6, wherein said first path slopes upwardly and said first conveyor is pivotable between said first and second positions.

8. The apparatus of claim 6, wherein said first conveyor includes a first platform having an upper side and further comprising a second platform having an upper side which is substantially flush with the upper side of said first platform in the first position of said first conveyor, said first transfer member being arranged to push commodities from said first path along the upper side of said second platform.

9. The apparatus of claim 8, wherein said first conveyor further comprises means for entraining the commodities of said series along the upper side of said first platform.

* * * * *